United States Patent Office 2,922,473
Patented Jan. 26, 1960

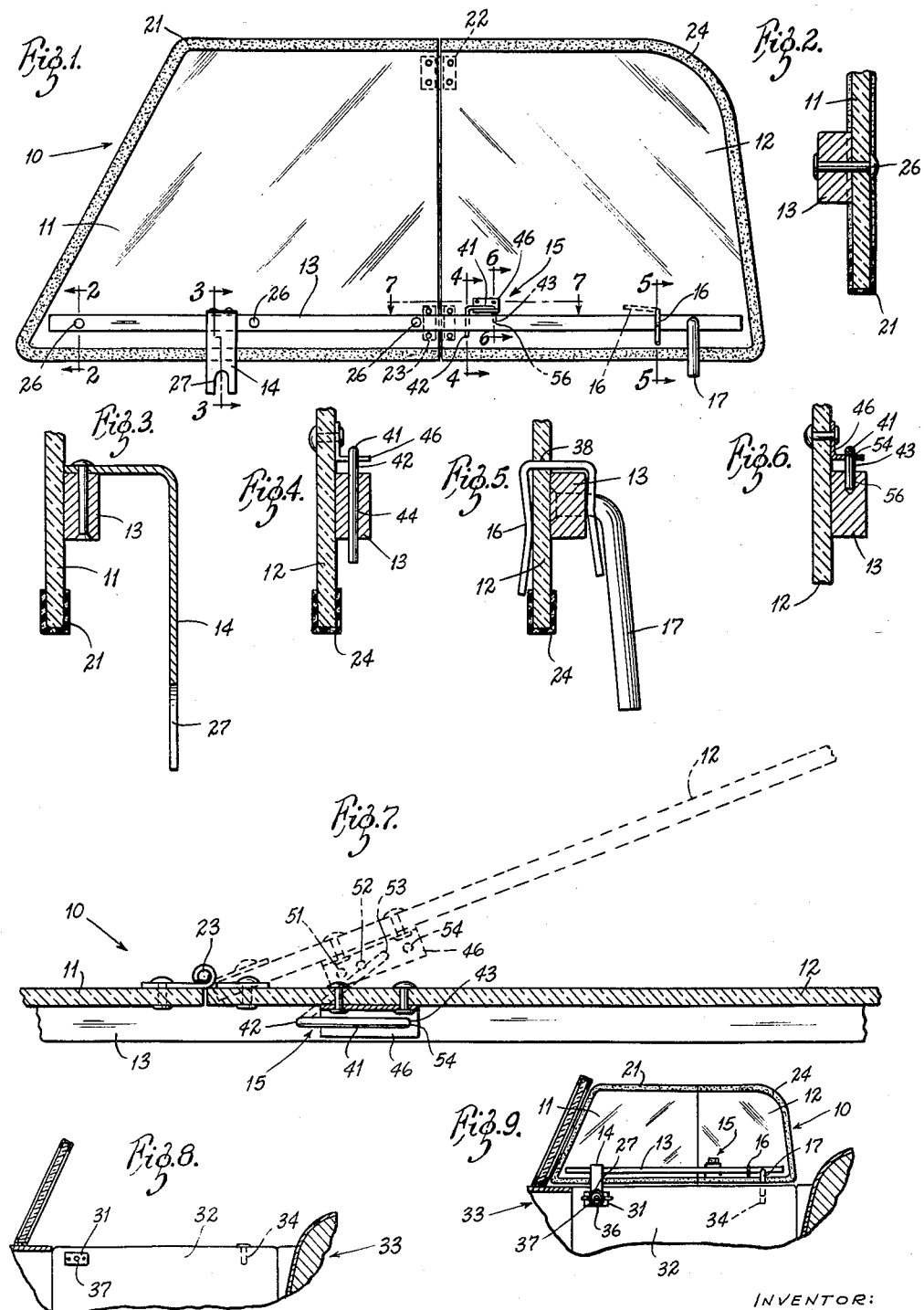

2,922,473

REMOVABLE AUTOMOBILE SIDE WINDOW

Richard Coleman Le Bron, Omaha, Nebr.

Application October 30, 1958, Serial No. 770,825

7 Claims. (Cl. 160—181)

This invention relates to improvements in automobile side windows, and, in particular, is concerned with a removable side window that has hinging means thereon by virtue of which the entire construction can be easily installed or removed from an automobile.

By means of this invention there has been provided an automobile side window that can be very simply installed upon sport cars or removed therefrom. On such cars it is quite desirable under certain climatic conditions to have the side windows entirely removed. On the other hand, under adverse cold weather or inclement weather conditions a side window is wanted for the obvious protection that it affords. This invention provides such a side window that can be very simply clamped to the side door and which further affords a rear panel that may be adjusted from a closed position to various degrees of opening. The adjustment of the rear panel is effected through a hinged relation with a forward panel of the side window and can be simply effected through the operation of an easily operated latching device.

Accordingly, the entire side window apparatus is one that can be very easily installed upon an automobile in a minimum amount of time by mechanically unskilled automobile drivers. Further, through the provision of plastic windows, which are rigid in construction, a very safe window device has been afforded. The simplicity of the side window is further featured by the adaptability of the rear and forward panels of the window structure to be folded over against one another for convenience in storing.

Accordingly, it is a primary object of this invention to provide a removable side window for ready attachment to an automobile in which the side windows are connected to a supporting bar that can be simply attached to a bracket on the automobile.

Another object of this invention is to provide a removable side window made of plastic which is connected to a transverse support bar with a provision for attaching the bar to a bracket arrangement upon an automobile in a very simple manner.

Still another object of this invention is to provide a removable side window having a forward and a rear panel which are hingedly connected to one another and are supported by a transverse support bar which features a latch means for hingedly securing the rear panel at various opening positions and the closed position.

Yet a further object of this invention is to provide a removable side window for automobiles comprising a front panel and a rear panel made of rigid plastic material which are hingedly connected to one another and supported on a support bar that may be attached to an automobile and in which the panels may be hinged to lie flat against one another for convenience in storing.

Further objects of this invention will appear in the detailed description which follows and will be further apparent to those skilled in the art.

For the purpose of illustration of this invention there is shown in the accompanying drawings a preferred embodiment of the invention. It is to be understood that these drawings are for the purpose of example only, however, and that the invention is not limited thereto.

In the drawings:

Figure 1 is a view in side elevation of the side window with the rear panel shown in a closed position against the support bar;

Figure 2 is an enlarged view in section taken on the line 2—2 of Figure 1 showing the attachment of the support bar to the forward panel of the side window;

Figure 3 is an enlarged view in section taken on the line 3—3 of Figure 1 showing the provision of an attachment bracket to the support bar for attachment to the bracket on a car door;

Figure 4 is an enlarged view in section taken on the line 4—4 of Figure 1 showing the latch construction for adjusting the rear panel with respect to the support bar;

Figure 5 is an enlarged view in section taken on the line 5—5 of Figure 1 showing a closure pin fastening the rear panel in the closed position to the support bar;

Figure 6 is an enlarged view in section taken on the line 6—6 of Figure 1 showing further details of the latch construction;

Figure 7 is an enlarged view in section taken on the line 7—7 of Figure 1 showing the means for adjusting the rear panel with respect to the support bar by the latch pin;

Figure 8 is a fragmentary view in vertical section taken from the interior of an automobile showing the bracket and closure well for supporting the support bar of the side window; and Figure 9 is a view taken similarly to Figure 8 showing the side window attached to the car.

The side window is generally indicated by the reference numeral 10 in the drawing. As shown in Figure 1, the major components include a front panel 11, a rear panel 12, and a support bar 13. A bracket arm 14 is secured to the forward portion of the support bar and at the rear portion thereof are situated a latching mechanism 15, a window closure pin 16, and a rear support bar pin 17.

The front panel 11 is made of a thick rigid transparent plastic material bounded by a protective rubber or plastic border 21 as shown in Figures 1 and 2. At the rear vertical wall of the front panel 11 are situated hinges 22 and 23 to which the rear panel 12 is attached. As further shown in Figure 7, this hinge is secured to the outside of the panels so that the rear panel may be turned over flat against the forward panel for ease in storing and the like when the side window is removed from the car. The rear panel 12 is similarly provided with a protective border 24.

The support bar 13 is secured to the front window panel 11 by three bolts 26. The means for connection is that shown typically in Figure 2. The means for attachment of the support bar and the window to the automobile comprises the forward bracket arm 14 which is in a general inverted L-shape as shown in Figure 3. A bifurcated slot portion 27 is provided at the bottom end. Thus, the bracket arm is adapted to fit over a bracket 31 shown secured to the inside of a car door 32 in the car 33 shown in Figure 8. It will be noted that the side door 32 in Figure 8 is further provided with a recessed well 34. This well element receives the support bar pin 17 which is secured to the rear of the support bar as shown in Figure 5. Thus, by means of the bracket arm 14 and the pin 17, the bar may be conveniently secured to the bracket 31 and the well 34 in the automobile. The final attachment is made by tightening down a wing nut 36 over a threaded stud 37 extending from the bracket 31 as shown in Figure 9.

A window closure pin 16 is fitted through an opening 38 in the rear panel as best shown in Figure 5. This pin 16 may be rotated into a locked position, as shown in Figure 5, which engages the outside of the support bar to hold the window in the closed position. By rotating the pin to a raised position oppositely to that shown in Figure 5 the rear panel may be released from the closed or locked position.

The latching device 15 is best shown by reference to Figures 1, 4, 6 and 7. This latching device comprises a generally J-shaped pin 41 having a long leg 42 and a short leg 43. The long leg 42 of the pin is removably and rotatably fitted within an opening 44 in the support bar, while the short leg 43 of the pin is adapted to be fitted through various openings in a latch plate 46 secured to the rear panel. These openings are designated 51, 52, 53 and 54 and provide for varying degrees of opening of the window as shown in Figure 7. It will further be noted that when the window is closed, as shown in Figure 6, the short leg 43 is adapted to fit through the last opening 54 corresponding to the closed position and to be anchored within an opening 56 in the support bar. This provides a further closure taken in combination with the closure pin 16 as an additional safety precaution.

Use

The side window 10 in the general assembly shown in Figure 1 may be very simply fastened to the car of Figure 8. This attachment may be made by merely taking the window in the vertical position and positioning the bracket arm 14 such that the bifurcated portion 27 fits over the stud 37 in the relationship shown in Figure 9. The support bar 17 is also engaged with the support well 34 for firm anchoring of the bar on the car door. The securing nut 36 is then drawn tight to lock the bracket arm in place.

The window may then be closed by adjusting the closure pin 16 to the position shown in full lines in Figure 1 and also shown in Figure 5. As an additional safety precaution the latch pin 41 may be adjusted so that the short leg 43 fits through the last opening 54 in the latch pin 46 and into the hole 56 in the support bar.

When the window is desired to be opened to any one of varying positions the closure pin 16 is rotated upwardly as in the position shown in dotted lines in Figure 1. Then the latch pin 41 is vertically withdrawn and the rear panel is moved outwardly as in the position shown in dotted lines in Figure 7. In this first position of partial opening the short leg of the latch pin may then be inserted through the opening 53 to provide a small degree of opening. For wider degrees of opening, the window may be rotated to a further counterclockwise position than that shown in Figure 7 and the latch pin may be adjusted so that the short leg 43 fits into the openings 52 or 51. It will be understood that the last opening 51 provides the greatest degree of window opening adjustment.

From the description above, it will be readily understood that a very simply operated side window has been provided. The rear panel can be simply adjusted to varying degrees of the opened position or closed position very effectively by means of the latching device and the closure pin. The entire window assembly can be very simply installed or withdrawn by the mere tightening or loosening of the nut 36 on the car bracket and proper operation of the bracket arm and the support bar pin 17. The entire installation or removal takes only a matter of seconds and can be effected by automobile drivers that have only even a slight degree of mechanical inclination. The removable side window is quite safe in operation, since the panels are made of a rigid plastic material and when removed can be safely and conveniently stored by folding the rear panel against the front panel.

Various changes and modifications may be made in the removable side window of this invention as will be readily apparent to those skilled in the art. Such changes and modifications are within the scope and teaching of this invention as defined by the claims appended hereto.

What is claimed is:

1. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, and means cooperating with the support bar and the rear panel for adjusting said rear panel in closed and different degrees of open position, and means for attaching said bar to an automobile.

2. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for attaching said bar to an automobile, and means for adjusting the rear panel in closed and different degrees of open position comprising an adjustable latch member cooperating with the support bar and the rear panel.

3. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for attaching said bar to an automobile, and closure means for fastening said rear panel to said bar comprising a U-shaped closure pin fitting through the rear panel in rotatable relation and having legs biasedly engageable with the outside of the window and the support bar.

4. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for attaching said bar to an automobile, means for adjusting the rear panel in closed and different degrees of open position comprising an adjustable latch member cooperating with the support bar and the rear panel, said latch member having a long leg and a short leg joined in a generally J-shaped configuration, said long leg being rotatably received in the support bar and a latch plate having a plurality of holes secured to said rear panel and said short leg being receivable in selected position in each of said holes corresponding to various positions of adjustment of the rear panel.

5. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for attaching said bar to an automobile, means for adjusting the rear panel in closed and different degrees of open position comprising an adjustable latch member cooperating with the support bar and the rear panel, closure means for fastening said rear panel to said bar comprising a U-shaped closure pin fitting through the rear panel in rotatable relation and having legs biasedly engageable with the outside of the window and the support bar.

6. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for attaching said bar to an automobile, means for adjusting the rear panel in closed and different degrees of open position comprising an adjustable latch member cooperating with the support bar and the rear panel, said latch member having a long leg and a short leg joined in a generally J-shaped configuration, said long leg being rotatably received in the support bar and a latch plate having a plurality of holes secured to said rear panel and said short leg being receivable in selected position in each of said holes corresponding to various positions of adjustment of the rear panel and closure means for fastening said rear panel to said bar comprising a U-shaped closure pin fitting through the rear panel in rotatable relation and having legs biasedly engageable with the outside of the window and the support bar.

7. A removable side window for automobiles comprising a vertical forward panel and a vertical rear panel, means hingedly connecting said panels in a vertical axis, a support bar connected to the inside of said forward panel and extending from a forward portion of the forward panel to the rear of the rear panel, means for adjusting the rear panel in closed and different degrees of open position comprising an adjustable latch member cooperating with the support bar and the rear panel, said latch member having a long leg and a short leg joined in a generally J-shaped configuration, said long leg being rotatably received in the support bar, and a latch plate having a plurality of holes secured to said rear panel, and said short leg being receivable in selected position in each of said holes corresponding to various positions of adjustment of the rear panel, closure means for fastening said rear panel to said bar comprising a U-shaped closure pin fitting through the rear panel in rotatable relation and having legs biasedly engageable with the outside of the window and the support bar and means for attaching said bar to an automobile, said means comprising a bracket arm attached to the bar and having a downwardly depending bifurcated portion cooperable with a bracket carried by the automobile door and a pin having an offset downwardly depending portion cooperable with the top of the door in a wall provided therein.

References Cited in the file of this patent

UNITED STATES PATENTS

| 1,644,018 | Hull | Oct. 4, 1927 |

FOREIGN PATENTS

| 297,898 | Great Britain | Oct. 4, 1928 |